(12) United States Patent
Chao

(10) Patent No.: US 7,213,191 B2
(45) Date of Patent: May 1, 2007

(54) SYSTEM AND METHOD FOR SECURELY STORING DATA IN A MEMORY

(75) Inventor: Kuo-Sheng Chao, Tu-Cheng (TW)

(73) Assignee: Hon Hai Precision Industry Co., Ltd., Tu-Chen, Taipei Hsien (TW)

( * ) Notice: Subject to any disclaimer, the term of this patent is extended or adjusted under 35 U.S.C. 154(b) by 428 days.

(21) Appl. No.: 10/950,738

(22) Filed: Sep. 27, 2004

(65) Prior Publication Data

US 2005/0091569 A1 Apr. 28, 2005

(30) Foreign Application Priority Data

Oct. 24, 2003 (TW) .............................. 92129550 A

(51) Int. Cl.
*G06F 11/10* (2006.01)
*H03M 13/29* (2006.01)

(52) U.S. Cl. ...................... 714/758; 714/765
(58) Field of Classification Search ................ 714/755, 714/758, 765, 766, 767, 773
See application file for complete search history.

(56) References Cited

U.S. PATENT DOCUMENTS

| | | | |
|---|---|---|---|
| 3,868,632 A * | 2/1975 | Hong et al. ................. | 714/755 |
| 4,277,844 A * | 7/1981 | Hancock et al. ............ | 714/755 |
| 4,375,100 A * | 2/1983 | Tsuji et al. ................. | 714/755 |
| 5,070,474 A * | 12/1991 | Tuma et al. .................. | 703/24 |
| 5,274,646 A | 12/1993 | Brey et al. ................. | 371/40.1 |
| 5,754,566 A | 5/1998 | Christopher et al. ..... | 371/40.18 |
| 5,757,825 A * | 5/1998 | Kimura et al. .............. | 714/758 |
| 5,781,565 A * | 7/1998 | Sako et al. ................. | 714/755 |
| 6,023,780 A * | 2/2000 | Iwatani ....................... | 714/770 |
| 6,993,705 B1 * | 1/2006 | MacLellan .................. | 714/800 |

* cited by examiner

*Primary Examiner*—Stephen M. Baker
(74) *Attorney, Agent, or Firm*—Morris Manning & Martin LLP; Tim Tingkang Xia, Esq.

(57) ABSTRACT

A system for securely storing data in a memory includes a memory (1) and a CPU (Central Processing Unit) (2). The memory is divided into a plurality of fixed-size blocks (10) for storing data. Each block includes a plurality of data pages (101), and a parity check page (102) storing check codes for checking and recovering byte data. Each data page includes a plurality of byte addresses for storing byte data including a CRC (Cyclic Redundancy Check), and a complement of the CRC in the hexadecimal system expressed as CRC'. The CPU is for calculating a CRC for each data page according to byte data of the data page, calculating a CRC' based on the CRC of the data page, and for identifying and correcting any incorrect bit data. A related method is also disclosed.

15 Claims, 6 Drawing Sheets

|   | 001 | | | 002 | | | FFE | FFF |
|---|---|---|---|---|---|---|---|---|
|   | B1 | B2 ··· | B8 |   |   |   |   |   |
| 101 | 0 | 1 |   | 1 |   |   | 00 | FF |
| 101 | 1 | 1 |   | 1 |   |   | 00 | FF |
|   | 1 | 1 |   |   |   |   |   | 01 |
|   | 0 | 0 |   | 0 |   |   | 00 | FF |
|   | ⋮ |   |   |   |   |   |   |   |
| 102 | 0 | 1 |   |   |   |   | — | — |

INCORRECT BIT DATA

FIG. 5

SYSTEM AND METHOD FOR SECURELY STORING DATA IN A MEMORY

BACKGROUND OF THE INVENTION

1. Field of the Invention

The present invention relates generally to electronic memory systems, and especially to a system and method for securely storing electronic data in a memory.

2. Description of the Related Art

A traditional storage medium in a computer system is the hard disk. More recently, hard disks have begun to be replaced by non-volatile semiconductor memories. An array of non-volatile random-access memories (NVRAMs) or non-volatile flash memories can substitute for hard-disk memory storage. The memory devices use electrically erasable programmable read-only memory (EEPROM) technology for storage cells. Floating polysilicon gates in these storage cells remain charged and intact when power is lost, providing non-volatile storage. These flash-memory systems are frequently used as a mass-storage replacement for a hard disk of a personal computer. Although these memories can store data when power is lost or when operation of the computer is improper, the correct data in a memory may be overlaid. In other words, there is no guarantee that the data stored is correct.

The art of memory storage has been described in publications such as U.S. Pat. No. 5,754,566 entitled "Method and Apparatus for Correcting a Multilevel Cell Memory by Using Interleaving" and issued on Mar. 19, 1998. This patent provides an apparatus and method for correcting errors in multilevel cell memory. The multilevel cell memory comprises multilevel cells for storing two or more data bits, with the data bits being sorted into two or more data words. Error correction codes are generated for each of the two or more data words, and are provided for checking for errors in the data words, and for correcting any errors found. However, operating the method in the memories expends considerable time and resources. In addition, the accuracy of error checking and error correcting is not high. Accordingly, what is needed is a system and method for securely storing data in a memory which can overcome the above-described problems of unwieldiness and inexactness.

SUMMARY OF THE INVENTION

A main objective of the present invention is to provide a system and method for securely storing data in a memory, in a way that can ensure the correctness and completeness of the data stored.

To achieve the above objective, the present invention provides a system for securely storing data in a memory. The system comprises a memory, a CPU (Central Processing Unit), and a data bus connecting the memory with the CPU.

The memory is logically divided into a plurality of fixed-size blocks for storing data. Each block comprises a plurality of data pages and a parity check page. The data page comprises a plurality of bytes for storing byte data including a CRC (Cyclic Redundancy Check), a complement of the CRC in the Hexadecimal system expressed as CRC'. The parity check page stores check codes for checking and recovering byte data. The CPU calculates a CRC for each data page according to byte data of the data page, and calculated a CRC' for each data page based on the CRC of the data page, and for identifying and correcting any incorrect bit data.

Further, the present invention provides method for securely storing data in a memory. The method comprises the steps of: (a) providing a memory comprising a plurality of data pages and a parity check page; (b) calculating a CRC for each data page according to the formula: CRC=(D[001]+D[002]+ . . . +D[FFC]+D[FFD])+0X94, and storing the CRC in a byte address FFF of the data page, wherein D[001], D[002] . . . D[FFC] and D[FFD] respectively represent byte data of each corresponding byte address 001, 002 . . . FFC and FFD; (c) calculating a CRC' for each data page based on the CRC of the data page, and storing the calculated CRC' in a byte address FFE of the data page; (d) setting parity check method, and calculating sum of bit data in each column of the data pages and the parity check page; (e) checking each column of bit data and byte data of each data page and determining whether there are any incorrect columns of bit data and any incorrect data pages; and (f) correcting each bit data located at a crossing of an incorrect column and a corresponding incorrect data page if there are any incorrect columns of bit data and any incorrect data pages.

Other objects, advantages and novel features of the present invention will be drawn from the following detailed description of a preferred embodiment and preferred method of the present invention with the attached drawings, in which:

BRIEF DESCRIPTION OF THE DRAWINGS

FIG. 5 is a schematic diagram of a mechanism for checking and correcting errors in bit data.

DETAILED DESCRIPTION OF THE PREFERRED EMBODIMENT

Figure 1:
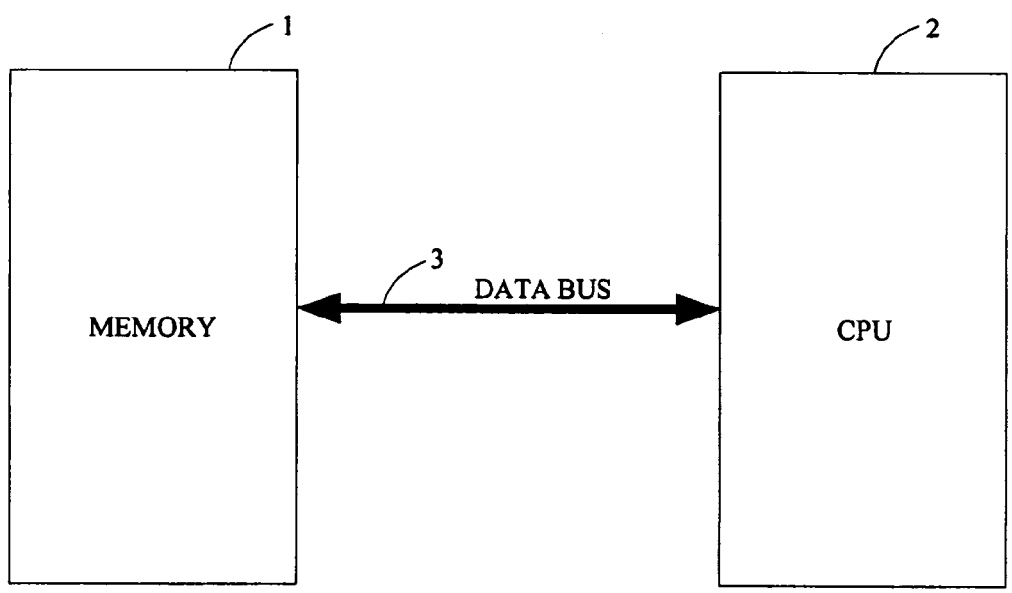
FIG. 1 is a block diagram of hardware configuration of a system for securely storing data in a memory in accordance with a preferred embodiment of the present invention.

FIG. 1 is a schematic diagram of hardware configuration of a system for securely storing data in a memory (hereinafter, "the system") in accordance with the preferred embodiment of the present invention. The system comprises a memory 1, a CPU (Central Processing Unit) 2, and a data bus 3. The CPU 2 is connected to the memory 1 through the data bus 3. The memory 1 may be a Flash Memory, and is provided for storing data. The CPU 2 reads data from external storages (not shown) through the data bus 3, calculates a CRC (Cyclic Redundancy Check) corresponding to each datum and a Hexadecimal complement of the CRC expressed as CRC', and stores the datum, the CRC and the CRC' in the memory 1. The CPU 2 can also check and correct errors in the data.

Figure 2:
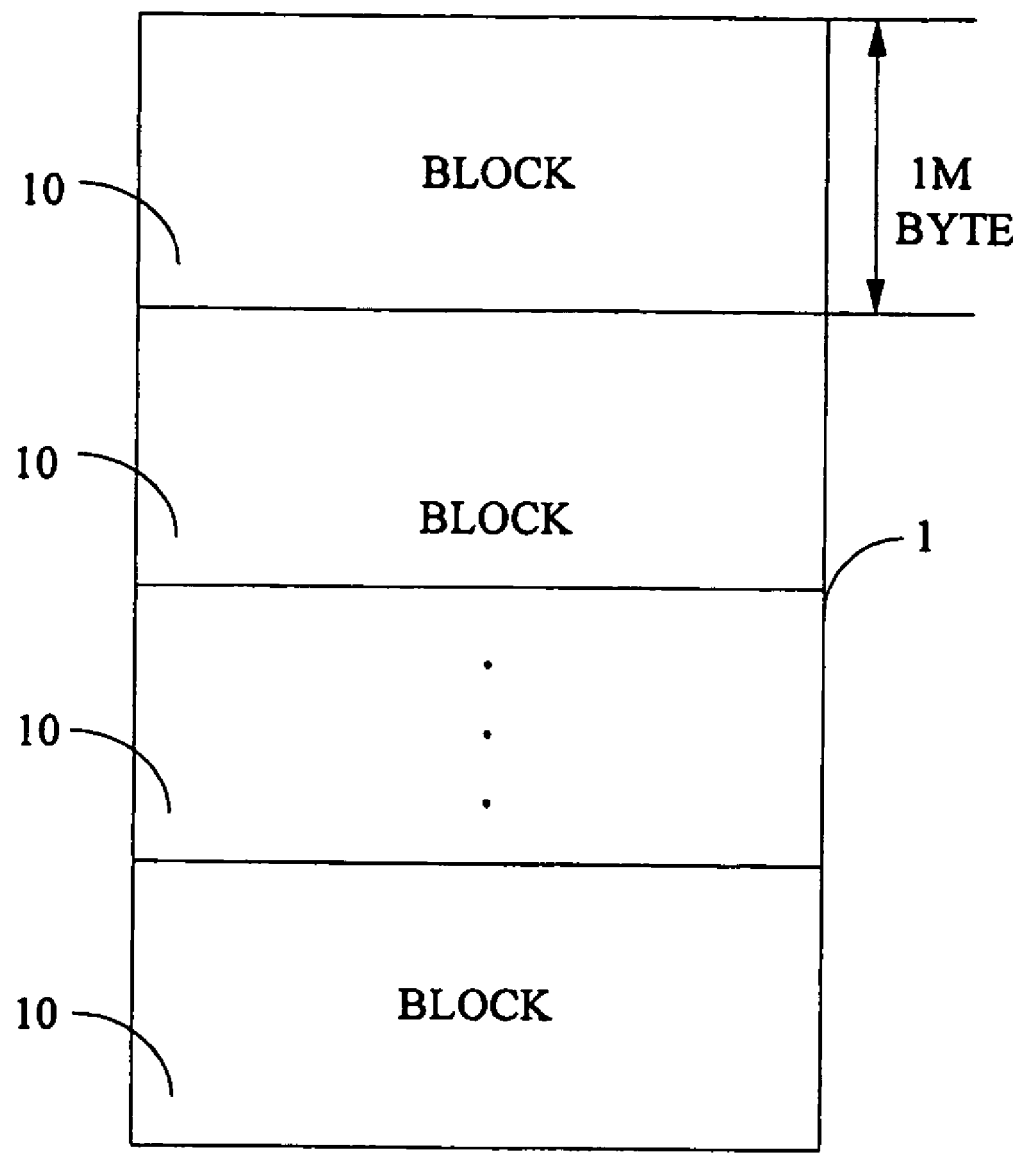
FIG. 2 is a schematic diagram of a storage structure of a memory of the system of FIG. 1.

FIG. 2 is a schematic diagram of a storage structure of the memory 1. The memory 1 is logically divided into a plurality of fixed-size blocks 10. Preferably, each block 10 is assigned a size of 1 megabyte (MB) for storing data.

Figure 3:
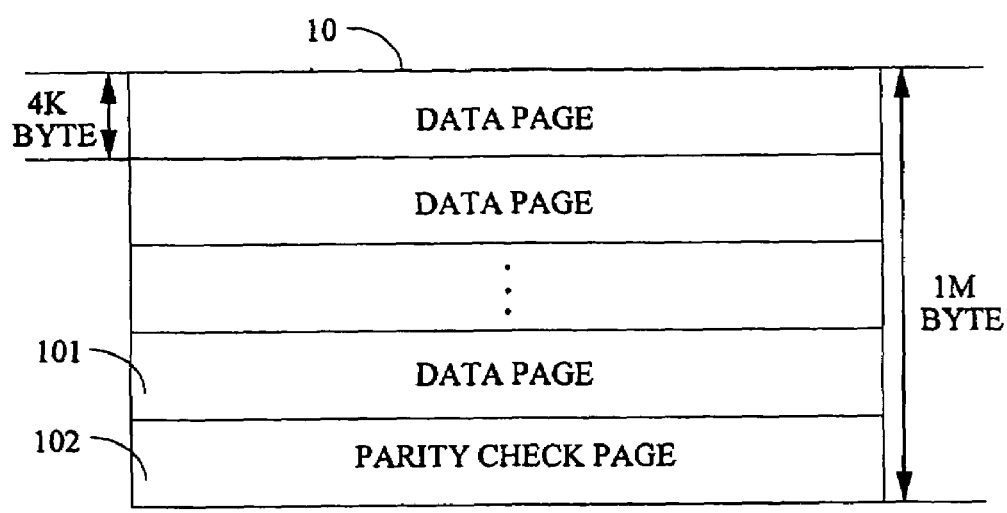
FIG. 3 is a schematic diagram of a storage structure of a block of the memory of FIG. 2.

FIG. 3 is a schematic diagram of a storage structure of any one block 10. The block 10 is logically divided into a plurality of fixed-size data pages 101 and a parity check page 102. Preferably, each data page 101 is assigned a size of 4 kilobytes (KB) for storing data, a CRC, and a CRC'. The parity check page 102 is also assigned a size of 4 kilobytes (KB) for storing check codes, and is provided for checking and recovering data. The check can be either an odd check or an even check.

Figure 4:
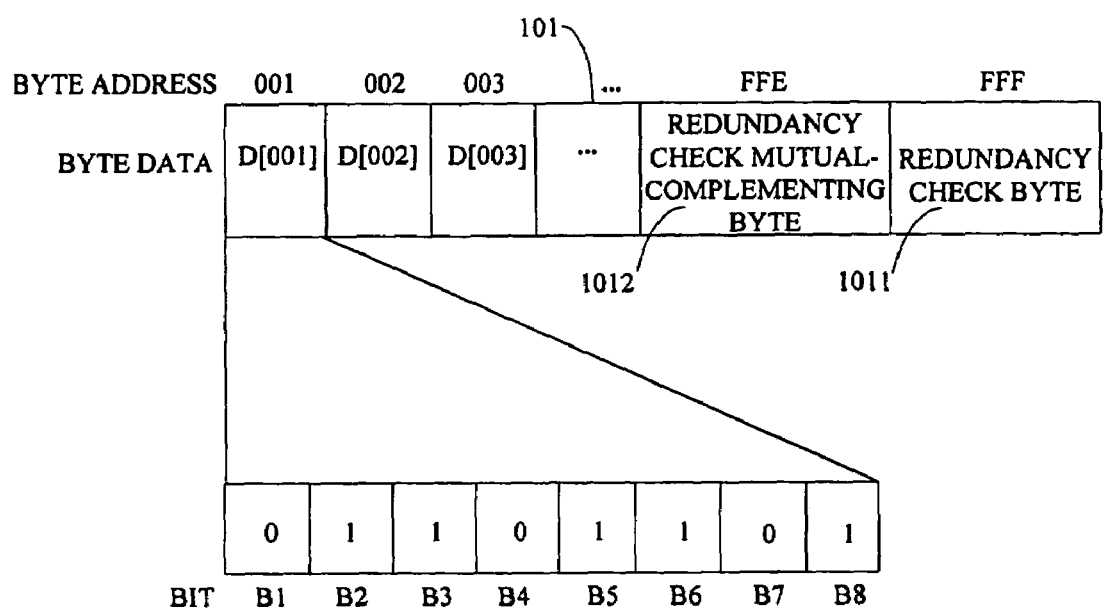
FIG. 4 is a schematic diagram of a storage structure of a data page of the block of FIG. 3.

FIG. 4 is a schematic diagram of a storage structure of any one data page 101. The data page 101 comprises a plurality of byte addresses designated from 001 to FFF. Each byte address contains a byte datum. The byte data corresponding to the byte addresses are respectively expressed as D[001], . . . D[FFF]. D[FFE] and D[FFF] that are respectively called a CRC' and a CRC of the data page 101. Further, FFE and FFF are respectively called a redundancy check mutual-complementing byte 1012 and a redundancy check byte 1011 of the data page 101. The CRC is calculated according to the formula: CRC=(D[001]+D[002]+ . . . )+0X94, wherein 0X94 is a redundancy additional number, and means the Hexadecimal number "94." The CRC' is a complement of the CRC in the Hexadecimal system. For example, if the CRC is "0XFF," the CRC' is "0X00." Each byte comprises 8 bits: B1, B2, B3 . . . B8 for storing corresponding bit data "0" or "1."

FIG. 5 is a schematic diagram of a mechanism for checking and correcting errors in bit data. The CPU 2 performs a parity check on data stored in each data page 101 according to check codes of the parity check page 102. The parity check may be either an even check or an odd check. In the preferred embodiment, the parity check is an even check. That is, if there are an odd number of '1's in a designated column of bit data, the corresponding check code is "1;" and if there are an even number of '1's in the column of bit data, the corresponding check code is "0." Thus, the total of each column of bit data including the check code is an even number. For example, the CPU 2 firstly adds all the bit data in the B1s of the data pages 101. If the total is an odd number and a corresponding check code in B1 of the parity check page 102 is "0," the column of bit data is considered as incorrect, because the total of the bit data in the column is not an even number. The CPU 2 also determines whether byte data (D[001], D[002], . . . ) in a data page 101 are correct according to a stored CRC' and a calculated CRC' of the data page 101. If the calculated CRC' is not equal to the stored CRC', this means one or more byte data of the data page 101 are incorrect. Then, the incorrect bit datum can be located by determining the bit datum at a crossing of an incorrect bit data column and an incorrect data page 101. According to this mechanism, if a bit datum is determined as being incorrect, for example the bit datum "1" shaded in FIG. 5, it is first corrected to "0", and then stored in the memory 1.

Figure 6:
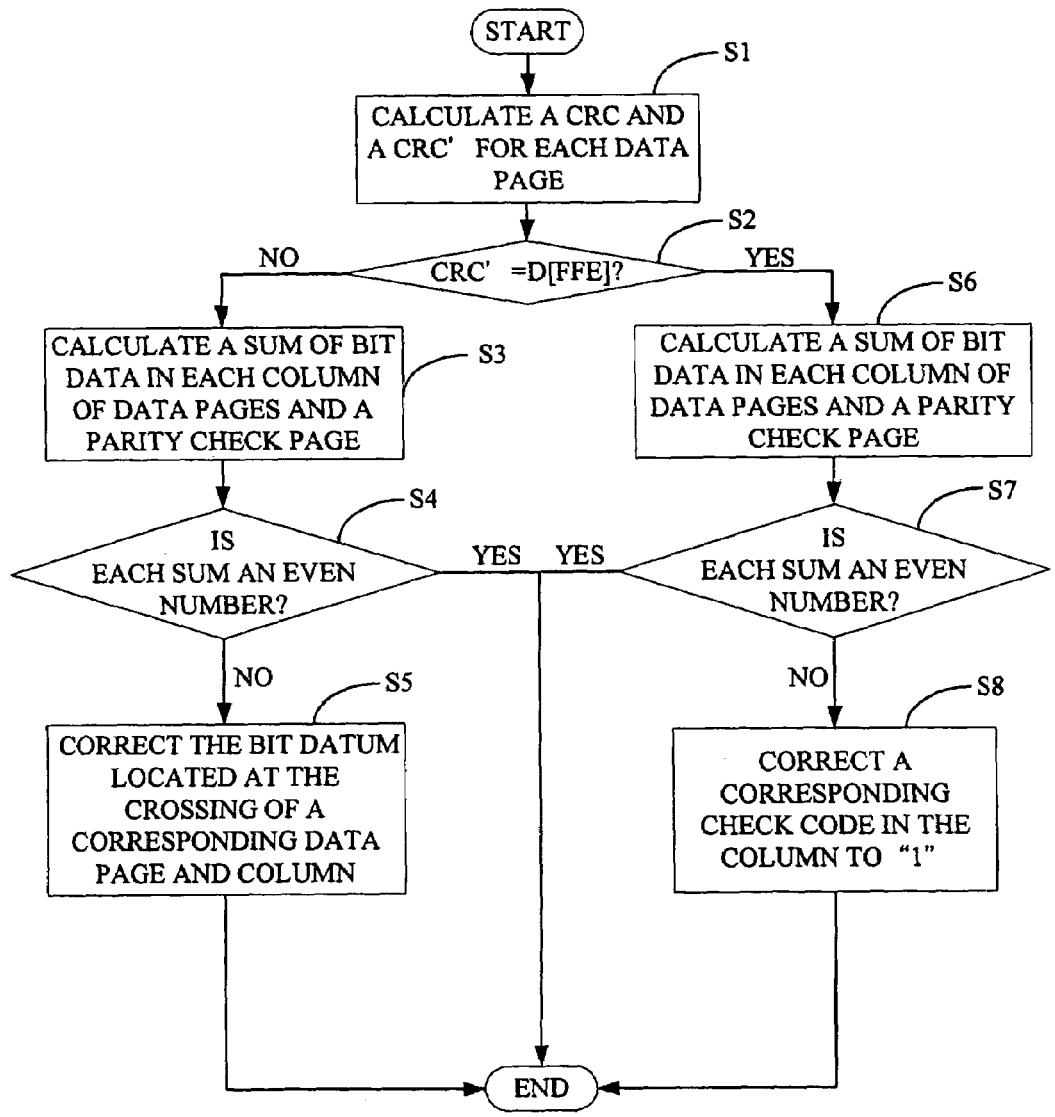
FIG. 6 is a flowchart of a preferred method for implementing the system of FIG. 1.

FIG. 6 is a flowchart of the preferred method for implementing the system. In step S1, the CPU 2 calculates a CRC for each data page 101 according to the formula: CRC=(D[001]+D[002]+ . . . )+0X94, and calculates a CRC' based on the CRC. In step S2, the CPU 2 determines whether the calculated CRC' of each data page 101 is equal to a corresponding stored CRC' in a byte address FFE of the data page 101, namely D[FFE]. If the calculated CRC' of each data page 101 is equal to its D[FFE], the procedure goes to step S6 described below. If a calculated CRC' of any data page 101 is not equal to its D[FFE], this means there are one or more incorrect bit data in the data page 101. In such case, in step S3, the CPU 2 calculates a SUM of bit data in each column of the data pages 101 and the parity check page 102, such as the bit data in the B1s as described above in relation to FIG. 5. In step S4, the CPU 2 determines whether each calculated SUM is an even number. If all the calculated SUMs are even numbers, the procedure is ended. In contrast, if a SUM of bit data in any column is an odd number, this means there is an incorrect bit datum in the column. In such case, in step S5, the CPU 2 corrects the bit datum that is located at the crossing of the incorrect data page 101 and the bit data column, and stores the corrected bit data in the memory 1, whereupon the procedure is ended.

In step S6, the CPU 2 calculates a SUM of bit data in each column of the data pages 101 and the parity check page 102, such as the bit data of the B1s as described above in relation to FIG. 5. In step S7, the CPU 2 determines whether each SUM is an even number. If all the SUMs are even numbers, the procedure is ended. In contrast, if any SUM is an odd number, this means the check code in the parity check page 102 of the corresponding column is incorrect. In such case, in step S8, the CPU 2 corrects the check code of the parity check page 102 of the column to "1," whereupon the procedure is ended.

Although the present invention has been specifically described on the basis of a preferred embodiment and preferred method, the invention is not to be construed as being limited thereto. Various changes or modifications may be made to the embodiment and method without departing from the scope and spirit of the invention.

What is claimed is:

1. A system for securely storing data in a memory, comprising:
 a memory divided into a plurality of fixed-size blocks for storing data, wherein each block comprises:
 a plurality of data pages comprising a plurality of byte addresses for storing byte data including a CRC (Cyclic Redundancy Check), and a complement of the CRC in the Hexadecimal system expressed as CRC'; and
 a parity check page for storing check codes for checking and recovering byte data; and
 a CPU (Central Processing Unit) connected to the memory through a data bus, for calculating a CRC for each data page according to byte data of the data page, calculating a CRC' for each data page based on the CRC of the data page, and identifying and correcting any incorrect bit data.

2. The system as claimed in claim 1, wherein the memory is a non-volatile memory.

3. The system as claimed in claim 1, wherein the CPU calculates the CRC for each data page according to the formula: CRC=(D[001]+D[002]+. . . D[FFC]+D[FFD])+0X94, wherein D[001], D[002]. . . D[FFC], D[FFD] respectively represent byte data of a corresponding byte address of the data page.

4. The system as claimed in claim 1, wherein the CPU can identify an incorrect bit datum located at a crossing of an incorrect data page and an incorrect column of bit data.

5. The system as claimed in claim 4, wherein if the calculated CRC' of a data page is not equal to a corresponding prestored CRC', the CPU determines that the data page is incorrect.

6. The system as claimed in claim 4, wherein the CPU determines a sum of the bit data in a column according to a predetermined parity check method, and if the sum indicates an error, the CPU determines that the column of bit data is incorrect.

7. The system as claimed in claim 6, wherein the parity check method is an even check, and a column of bit data is determined to be incorrect if the sum of the bit data in the column is an odd number.

8. A method for securely storing data in a memory, comprising the steps of:
- providing a memory comprising a plurality of data pages and a parity check page;
- calculating a CRC (Cyclic Redundancy Check) for each data page according to the formula: CRC=(D[001]+D[002]. . . D[FFC]+D[FFD])+0X94, and storing the calculated CRC in a byte address FFF of the data page, wherein D[001], D[002]. . . D[FFC] and D[FFD] respectively represent byte data of each corresponding byte address 001, 002 . . . FFC and FFD;
- calculating a CRC' for each data page based on the CRC of the data page, and storing the calculated CRC' in a byte address FFE of the data page;
- setting a parity check method, and calculating a sum of bit data in each column of the data pages and the parity check page;
- checking the bit data of each column and byte data of each data page and determining whether there are any incorrect columns of bit data and any incorrect data pages; and
- correcting each bit datum located at a crossing of an incorrect column and a corresponding incorrect data page, if there are any incorrect columns of bit data and any incorrect data pages.

9. The method as claimed in claim 8, wherein a data page is determined to incorrect if the calculated CRC' of the data page is not equal to a corresponding prestored CRC' of the data page.

10. The method as claimed in claim 8, wherein the step of correcting each bit datum means correcting the bit datum from "1" to "0," or correcting the bit datum from "0" to "1".

11. The method as claimed in claim 8, wherein the parity check method can be an odd check.

12. The method as claimed in claim 8, wherein the parity check method is an even check.

13. The method as claimed in claim 12, wherein a column of bit data is determined to be incorrect if the sum of the bit data in the column is an odd number.

14. A method for securely storing data in a memory with a plurality of data pages and a parity check page, comprising the steps of:
- calculating a Cyclic Redundancy Check (CRC) value of each data page and a complement value (CRC') of said CRC value;
- saving said CRC value and said CRC' value in said each data page;
- acquiring saved value in said parity check page according to a preset rule;
- allowing data in said each data page correctable by recalculating said CRC' value to compare with said saved CRC' value so as to identify correctness of said data in said each data page, and calculating a sum of bit data in each column of said data pages and said parity check page to identify correctness of said sum based on said preset rule so as to identify a column location of said data pages and said parity check page needed to be corrected.

15. The method as claimed in claim 14, wherein said CRC value is calculated by CRC=(D[001]+D[002]. . . D[FFC]+D[FFD])+0X94, wherein D[001], D[002]. . . D[FFC] and D[FFD] respectively represent byte data of each corresponding byte address 001, 002 . . . FFC and FFD in said each data page.

* * * * *